United States Patent [19]
Yoo et al.

[11] Patent Number: 5,612,420
[45] Date of Patent: *Mar. 18, 1997

[54] PROCESS FOR PREPARING A POLYMERIC GLOSS MODIFIER

[75] Inventors: Jin N. Yoo; Dong O. Kim; Yeong R. Chang; Jong K. Yeo, all of Daejeon, Rep. of Korea

[73] Assignee: Lucky Limited, Seoul, Rep. of Korea

[ * ] Notice: The term of this patent shall not extend beyond the expiration date of Pat. No. 5,574,110.

[21] Appl. No.: 211,946

[22] PCT Filed: Sep. 7, 1993

[86] PCT No.: PCT/KR93/00081

§ 371 Date: Apr. 21, 1994

§ 102(e) Date: Apr. 21, 1994

[87] PCT Pub. No.: WO94/05715

PCT Pub. Date: Mar. 17, 1994

[30] Foreign Application Priority Data

Sep. 8, 1992 [KR] Rep. of Korea ...................... 92-16383

[51] Int. Cl.$^6$ ...................... C08F 257/02; C08F 265/06; C08L 51/00

[52] U.S. Cl. ...................... 525/296; 525/67; 525/82; 525/309

[58] Field of Search ............... 525/296, 67, 309, 525/82

[56] References Cited

U.S. PATENT DOCUMENTS 3,732,336  5/1973  Duke .
3,923,931  12/1975  Fechillas .
4,920,178  4/1990  Zabrocki .
5,237,004  8/1993  Wu ........................................... 525/85

*Primary Examiner*—Vasu S. Jagannathan
*Attorney, Agent, or Firm*—Anderson Kill & Olick P.C.

[57] ABSTRACT

Polymeric glass modifier having a partially crosslinked structure capable of effectively reducing the surface gloss of a thermoplastic resin, is prepared by (a) emulsion polymerizing an acrylic monomer, an ethylenically unsaturated cyanide compound end, optionally, an aromatic vinyl monomer to obtain a copolymer latex of a linear structure; (b) conducting a crosslinking emulsion polymerization of the resultant linear copolymer latex obtained in step (a) with an addition of the same monomers used in step (a), an acrylamide inter-particle crosslinking agent and an ethylenically unsaturated crosslinking agent to produce a partially crosslinked latex; and (c) coagulating and interparticle crosslinking the partially crosslinked latex obtained in step (b) with an addition of an acid to obtain the polymeric gloss modifier.

7 Claims, No Drawings

PROCESS FOR PREPARING A POLYMERIC GLOSS MODIFIER

TECHNICAL FIELD

The present invention relates to a process for preparing a gloss-modifying acrylic resin capable of reducing the surface gloss of a thermoplastic resin such as polyvinyl chloride(PVC); and, more particularly, to a process which comprises coagulating and inter-particle crosslinking a partially crosslinked polymer latex prepared by a two-step emulsion polymerization process.

BACKGROUND ART

Various attempts have been made to develop a satisfactory method to reduce the surface gloss of a thermoplastic resin. They may include processing the thermoplastic resin at a low temperature, incorporating inorganic fillers such as silica and calcium carbonates into the resin and the like. However, the above techniques usually deteriorate the physical properties of the final products detrimentally. In order to overcome the drawback mentioned above, organic fillers such as polymeric gloss modifiers have been developed, which can reduce the gloss by virtue of their working principles that when the polymeric gloss modifier is incorporated into a thermoplastic resin(matrix resin), the polymeric modifier particles having lower thermal shrinkability than the matrix resin(e.g., PVC) sit on the top of the thermoplastic resin because of the difference in the thermal shrinkability between the polymeric modifier and the matrix resin to scatter light. Acryloid$^R$ KF-710, marketed by Rohm and Haas of the U.S., is a gloss-modifying acrylic resin prepared by a bulk polymerization process. However, the prior art scheme still suffers from various deficiencies related to the complicated process requirements involved and high manufacturing cost.

DISCLOSURE OF INVENTION

Accordingly, it is an object of the present invention to provide a process for efficiently and economically preparing a polymeric gloss modifier which can effectively reduce the surface gloss of a thermoplastic resin, which comprises: preparing a latex of partially crosslinked polymer having a semi-interpenetrating polymer network by way of first carrying out a non-crosslinking emulsion polymerization to produce a linear polymer resin of a low molecular weight and then conducting a crosslinking emulsion polymerization to produce a crosslinked polymer resin; and coagulating and inter-particle crosslinking the latex to produce a gel of a high molecular weight.

Another object of the present invention is to provide a process for preparing a low gloss thermoplastic resin compound which comprises blending a conventional thermoplastic resin with the polymeric gloss modifier obtained in accordance with the inventive process.

In accordance with one aspect of the present invention, there is provided a process for preparing a polymeric gloss modifier having a partially crosslinked structure, i.e., having both a crosslinked structure and a linear structure, which comprises:

(a) emulsion polymerizing an acrylic monomer, a cyanide compound and, optionally, an aromatic vinyl monomer to obtain a copolymer latex of a linear structure;

(b) conducting a crosslinking emulsion polymerization of the resulting linear copolymer latex obtained in step(a) with an addition of the same monomers used in step(a), an acrylamide inter-particle crosslinking agent and a crosslinking agent to produce a partially crosslinked latex; and (c) coagulating and inter-particle crosslinking the partially crosslinked latex obtained in step(b) with an addition of an acid to obtain the polymeric gloss modifier.

In accordance with another aspect of the present invention, there is provided a process for preparing a low gloss thermoplastic resin compound which comprises blending a conventional thermoplastic resin with the polymeric gloss modifier prepared in accordance with the present invention.

Generally, preparation of resins may be carried out by employing such conventional methods as: emulsion polymerization, suspension polymerization, solution polymerization, bulk polymerization and the like. Of these, the emulsion polymerization method is preferably employed in the present invention. The novel process of the present invention comprises two steps of polymerization: that is, a first emulsion polymerization process to polymerize monomers in a linear structure (referred to as the "non-crosslinking polymerization step") and a second emulsion polymerization process which crosslinks monomers in the presence of the latex obtained in the first step(referred to as the "crosslinking polymerization step").

In the non-crosslinking polymerization step, the monomers to be emulsion polymerized include an acrylic monomer, a cyanide compound and, optionally, an aromatic vinyl monomer.

The aromatic vinyl monomer may be, for example, styrene, monochlorostyrene, methyl styrene, dimethyl styrene, etc. Examples of the acrylic monomer which may be employed include: acrylates such as methyl acrylate, ethyl acrylate, n-butyl acrylate, isobutyl acrylate, dodecyl acrylate, and 2-ethylhexyl acrylate; and methacrylates such as methyl methacrylate, ethyl methacrylate and n-butyl methacrylate. These monomers may be employed alone or in combination with each other. Examples of the cyanide compound may include acrylonitrile, methacrylonitrile, etc.

The aromatic vinyl monomer may be employed in the non-crosslinking polymerization step in an amount, preferably, from 0 to 70% and more preferably from 40 to 70% by weight of the total monomers employed; the amount of the acrylic monomer employed may range preferably from 25 to 80%, more preferably from 25 to 50% by weight; and the amount of the cyanide compound may range preferably from 5 to 50%, more preferably from 30 to 50% by weight of the total monomers employed.

In the non-crosslinking polymerization step, a water soluble initiator including persulfates such as potassium persulfate, ammonium persulfate and the like may be primarily used as a polymerization initiator. However, oil-soluble initiators, redox system, and others conventionally employed in emulsion polymerization may also be used. Such an initiator may preferably be used in an amount of 0.05 to 3 parts per 100 parts by weight of the total monomers used in the non-crosslinking polymerization step.

An anionic surfactant may be used as an emulsifier in this non-crosslinking polymerization step. Representative examples of such surfactants may include: alkyl aryl sulfonates such as sodium dodecyl benzene sulfonate, potassium dodecyl benzene sulfonate and sodium alkyl benzene sulfonate; alkyl sulfonates such as sodium dodecyl sulfonate and potassium dodecyl sulfonate; sulfates such as sodium dodecyl sulfate, sodium octyl sulfate and sodium octadecyl sulfate; salts of rosin acid such as potassium rosinate and sodium rosinate; and fatty acid salts such as potassium oleate and potassium stearate. Generally, it may be preferably used in an amount of 0.1 to 5 parts per 100 parts by weight of the total monomers used.

In addition, mercaptans such as t-dodecyl mercaptan and n-dodecyl mercaptan; terpenes such as dipentene and t-terpene; and halogenated hydrocarbons such as chloroform and carbon tetrachloride may be used as a chain transfer agent. It may be suitably used in an amount of 0.5 to 6 parts per 100 parts by weight of the total monomers used.

The non-crosslinking emulsion polymerization may be carried out at a temperature ranging from 50° C. to 90° C., preferably from 60° C. to 85° C. for a period of 2 to 12 hours.

Subsequently, in the second polymerization step (crosslinking polymerization step), additional monomer mixture as used in the first step(non-crosslinking polymerization step), an acrylamide inter-particle crosslinking agent and a crosslinking agent are further introduced into the non-crosslinked latex obtained in the first step.

Examples of the acrylamide inter-particle crosslinking agent may include N-hydroxy alkyl acrylamides such as N-methylol acrylamide and N-alkyl ether acrylamide derivatives such as N-methyl ether acrylamide. These agents may be employed alone or in combination with each other. A suitable amount of the inter-particle crosslinking agent employed in the crosslinking polymerization step may range from 0.1 to 15 parts, preferably from 0.5 to 4 parts by weight of the total monomers used in this step.

The crosslinking polymerization is carried out, in the presence of the inter-particle crosslinking agent and the crosslinking agent, using the additional monomer mixture consisting of 0 to 50%, preferably from 10 to 30% by weight of the aromatic vinyl monomer, 30 to 90%, preferably from 40 to 60% by weight of the acrylic monomer, and 5 to 50%, preferably from 20 to 40% by weight of the cyanide compound.

Examples of the cross-linking agent may include: vinyl compounds such as divinylbenzene; vinyl aromatic compounds such as divinyltoluene and divinylxylene; allyl compounds such as N,N-diallylmelamine; allyl vinyl compounds such as allyl acrylate; vinylidene compounds such as ethylene glycol dimethacrylate; allyl vinylidene compounds such as allyl methacrylate; and diacrylate compounds such as hexane diol diacrylate. It may be suitably used in an amount of 0.1 to 5 parts, preferably from 0.5 to 2 parts per 100 parts by weight of the total monomers employed.

The polymerization initiator and the emulsifier employed in the non-crosslinking polymerization step may also be used in the crosslinking polymerization step. A suitable amount of the initiator in this latter step may range from 0.1 to 3 parts; and a suitable amount of the emulsifier may range from 0.01 to 3 parts, per 100 parts by weight of the total monomers used.

The partially crosslinked latex prepared by the above two polymerization steps is then subjected to a coagulation step in accordance with a conventional process, wherein the inter-particle crosslinking is formed between the latex particles by the action of the interparticle crosslinking agent introduced in the crosslinking polymerization step.

The coagulation step may be preferably carried out under an acidic condition, suitably with pH ranging from 1 to 4, by adding an acid to promote the inter-particle crosslinking reaction.

Examples of the acid to be used during the coagulation step may include sulfuric acid, chloric acid, etc. The gel content of the resin represents the weight ratio of the crosslinked portion in the resin, which may be determined as follows: An appropriate amount of the resin is swelled with an organic solvent such as acetone or toluene; and centrifuged to separate the gel. The gel so separated is dried and weighed. The gel content is calculated by dividing the weight of the dried gel by the weight of the resin, as represented by the following formula:

$$\text{The gel content}(\%) = \frac{\text{The weight of the dried gel}}{\text{The weight of the resin}} \times 100$$

A suitable gel content of the resin of the present invention may range from 10 to 90% and may be controlled by adjusting the weight ratio of the resin produced in the crosslinking step to the resin obtained in the non-crosslinking step.

The surface gloss of a thermoplastic resin, e.g., PVC, may be reduced by mixing it with the resin of the present invention under a conventional condition: 1 to 10 parts by weight of the gloss modifier resin prepared in accordance with the present invention may be mixed with 100 parts by weight of the thermoplastic resin.

The effect of the gloss modifier prepared in accordance with the present invention for reducing the gloss of a thermoplastic resin may be evaluated as follows: in a Henschel mixer, 100 parts by weight of PVC, 3 parts by weight of dibutyl tin maleate, 6 parts by weight of dioctyl phthalate, 1 part by weight of polyethylene wax, 10 parts by weight of MBS system(MB-830C, Lucky Ltd., KOREA) and 5 parts by weight of the gloss modifier of the present invention are mixed and dispersed. The resulting mixture is extruded into the form of a pellet using a single screw extruder; and then a plate of test specimen is obtained by injection molding. The gloss of the specimen is determined by using a glossmeter(TOYO SEIKI).

The following Examples are intended to illustrate the present invention more specifically, without limiting the scope of the invention. All units, percentages, parts, etc. as used in the Examples are by weight, unless otherwise specified.

EXAMPLE 1

A 1L flask was charged with 200 g of water, 3 g of sodium dodecyl sulfate, 0.4 g of potassium persulfate and 0.5 g of t-dodecyl mercaptan, and 100 g of a monomer mixture consisting of 60% of styrene, 30% of butyl acrylate and 10% of acrylonitrile for the non-crosslinking emulsion polymerization thereof. The reaction mixture was polymerized at 70° C. for 10 hours with stirring.

Into the non-crosslinked latex so obtained were introduced 100 g of a monomer mixture consisting of 30% of styrene, 60% of butyl acrylate and 10% of acrylonitrile, 1 g of N-methylol acrylamide, 200 g of water and 0.1 g of potassium persulfate, 0.3 g of divinyl benzene and 0.5 g of sodium dodecyl sulfate so that the gel content of the latex became about 50%. The reaction mixture was reacted at 60° C. for 10 hours.

300 g of the partially crosslinked latex so prepared and 3 g of 5% sulfuric acid solution were introduced into an aqueous calcium chloride solution at 60° C. for coagulation; and, the resulting solution was aged at 70° C. for 30 minutes. The mixture so coagulated was filtered and dried to obtain a resin in the form of a dry powder.

EXAMPLE 2

A 1L flask was charged with 200 g of water, 1 g of sodium dodecyl sulfate, 0.4 g of potassium persulfate, 0.5 g of t-dodecyl mercaptan, and 100 g of a monomer mixture consisting of 60% of styrene, 30% of butyl acrylate and 10% of acrylonitrile for the non-crosslinking emulsion polymerization thereof. The reaction mixture was polymerized at 70° C. for 10 hours with stirring.

Into the non-crosslinked latex so obtained were introduced 233 g of a monomer mixture consisting of 60% of methyl methacrylate, 20% of butyl acrylate and 20% of acrylonitrile, 23 g of N-methylol acrylamide, 474 g of water, 0.3 g of potassium persulfate and 4 g of hexane diol diacrylate so that the gel content of the latex became about 70%. The reaction mixture was reacted at 70° C. for 10 hours.

300 g of the partially crosslinked latex so prepared was coagulated as in Example 1 to obtain a dry powder.

EXAMPLE 3

A 1L flask was charged with 200 g of water, 2 g of sodium dodecyl sulfate, 0.4 g of potassium persulfate, 0.5 g of t-dodecyl mercaptan, and 100 g of a monomer mixture consisting of 60% of methyl methacrylate, 30% of butyl acrylate and 10% of acrylonitrile for the non-crosslinking emulsion polymerization thereof. The reaction mixture was polymerized at 70° C. for 10 hours with stirring.

Into the latex were introduced 42.86 g of a monomer mixture consisting of 60% of methyl methacrylate, 30% of butyl acrylate and 10% of acrylonitrile, 0.43 g of N-methylol acrylamide, 129.9 g of water, 0.07 g of potassium persulfate and 1 g of hexane diol diacrylate so that the gel content of the latex became about 30%. The reaction mixture was reacted at 70° C. for 10 hours.

300 g of the partially crosslinked latex so prepared was coagulated as in Example 1 to obtain a dry powder.

Comparative Example 1

The procedures described in Example 1 were repeated except that N-methylol acrylamide was not used in the crosslinking polymerization step.

Comparative Example 2

The procedures described in Example 2 were repeated except that hexane diol diacrylate was not used in the crosslinking polymerization step.

Comparative Example 3

The procedures described in Example 2 were repeated except that sulfuric acid was not added to the aqueous calcium chloride solution during the coagulation step.

The gloss properties of PVC compound samples blended with the resin powders obtained in Examples 1 to 3 and Comparative Examples 1 to 3 were determined by the above-described method and the results are shown in Table 1.

TABLE 1

|  | Example 1 | Example 2 | Example 3 |
| --- | --- | --- | --- |
| gloss (60°) | 36.7 | 28.4 | 32.3 |
|  | Comparative Example 1 | Comparative Example 2 | Comparative Example 3 |
| gloss (60°) | 72.3 | 74.3 | 55.3 |

As can be seen from Table 1, the gloss of PVC blended with the resins prepared in Examples 1 to 3 in accordance with the present invention was reduced considerably compared with that of PVC blended with the resins prepared in Comparative Examples 1 to 3.

While the invention has been described in connection with the specific embodiments contained herein, it should be recognized that various modifications and changes may be made without departing from the spirit and scope of the invention as defined by the claims that follow.

What is claimed is:

1. A process for preparing a polymeric gloss modifier which comprises:
   (a) emulsion polymerizing an acrylic monomer, an ethylenically unsaturated cyanide compound and, optionally, an aromatic vinyl monomer to obtain a copolymer latex of a linear structure;
   (b) conducting a crosslinking emulsion polymerization of the resulting linear copolymer latex obtained in step(a) with an addition of the same monomers used in step(a), an acrylamide inter-particle crosslinking agent and an ethylenically unsaturated crosslinking agent to produce a partially crosslinked latex; and
   (c) coagulating and inter-particle crosslinking the partially crosslinked latex obtained in step(b) with an addition of an acid to obtain the polymeric gloss modifier.

2. The process of claim 1 wherein the acrylamide inter-particle crosslinking agent is N-hydroxy alkyl acrylamide or N-alkyl ether acrylamide derivatives.

3. The process of claim 1 wherein the acrylamide inter-particle crosslinking agent is employed in an amount of 0.1 to 15 parts by weight per 100 parts by weight of the total monomers used in the crosslinking polymerization of step(b).

4. The process of claim 1 wherein the gel content of the gloss modifier ranges from 10 to 90% by weight.

5. The process of claim 1 wherein the acid is employed in an amount to make pH 1 to 4 of the latex.

6. The process of claim 1 wherein the acid is sulfuric acid or chloric acid.

7. A process for preparing a low gloss thermoplastic resin compound which comprises blending the polymeric gloss modifier obtained in claim 1 with the thermoplastic resin.

* * * * *